BEST AVAILABLE COPY
J. Green.
Gas Furnace.
No. 3,177.
Reissued Nov. 3, 1868.
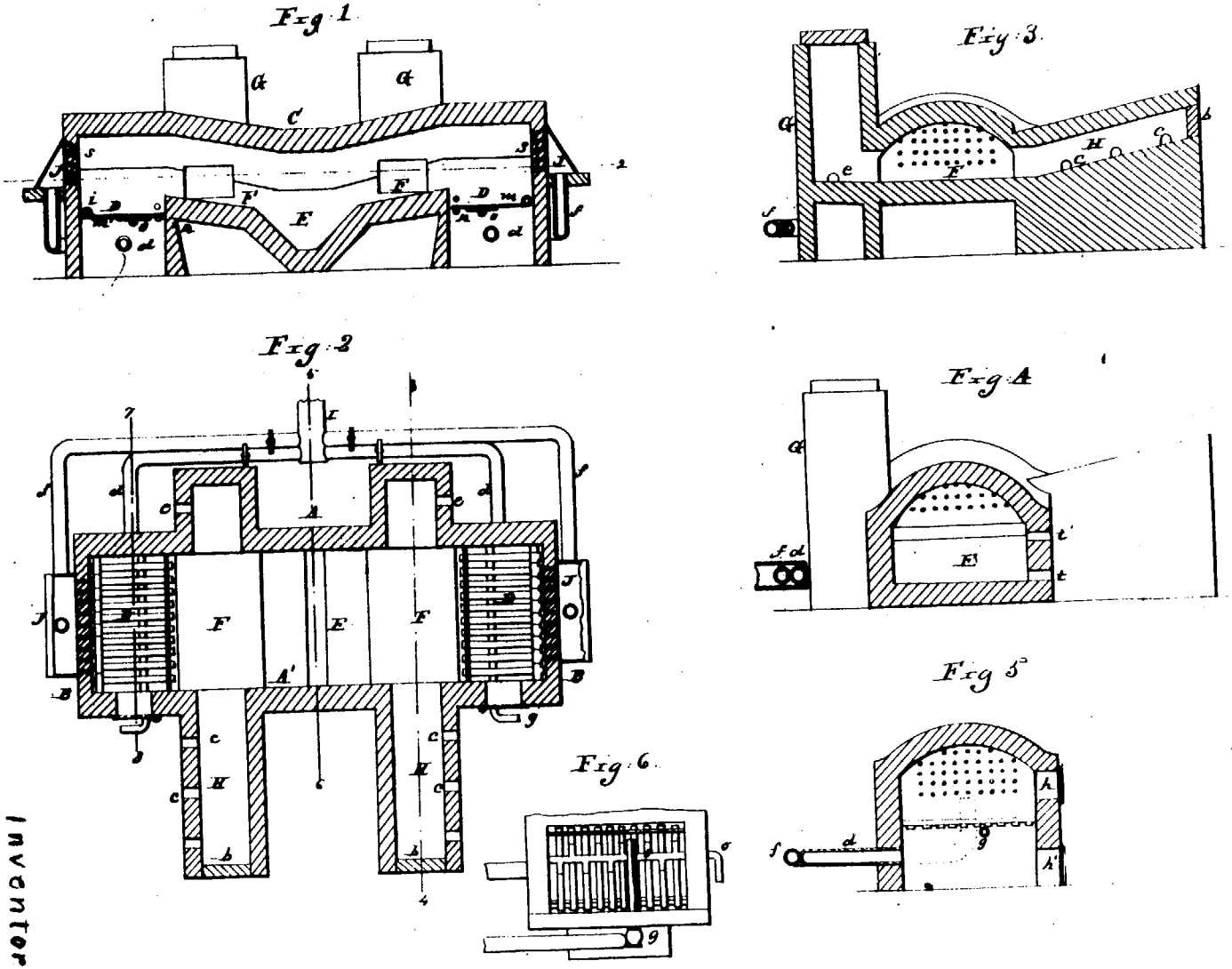
Witnesses:
Inventor:
Jacob Green
By his Atty
H. Howson
THE GRAPHIC CO. PHOTO-LITH. 39 & 41 PARK PLACE, N.Y.

BEST AVAILABLE COPY

UNITED STATES PATENT OFFICE.

JACOB GREEN, OF NORRISTOWN, AND THOMAS H. WILLSON, HIRAM WILLSON, AND CHARLES R. ADAMS, OF PHILADELPHIA, PA., AND SAMUEL MUNN, OF HACKENSACK, N. J., ASSIGNEES OF JACOB GREEN.

IMPROVEMENT IN MELTING AND SMELTING FURNACES.

Specification forming part of Letters Patent No. 63,240, dated March 26, 1867; Reissue No. 3,177, dated November 3, 1868.

DIVISION A.

*To all whom it may concern:*

Be it known that we, JACOB GREEN, of Norristown, Montgomery county, Pennsylvania, and THOMAS H. WILLSON, HIRAM WILLSON, and CHARLES R. ADAMS, of Philadelphia, Pennsylvania, and SAMUEL MUNN, of Hackensack, Bergen county, New Jersey, are the owners of certain Letters Patent granted, on the 26th day of March, 1867, to the said JACOB GREEN, for an Improvement in Furnaces; and we do hereby declare the following to be a full, clear, and exact description of the same.

The invention of the said JACOB GREEN consists of a furnace to which air and steam are admitted, and in which escape openings or flues are arranged, as fully described hereinafter, so that there is a greater pressure within than without the furnace, and a more thorough combustion of the fuel and gases, and a more uniform distribution of heat is obtained than in furnaces of the ordinary construction.

In order to enable others skilled in the art to make and use the invention, we will now proceed to describe its construction and operation, reference being had to the accompanying drawing, which forms a part of this specification, and in which—

Figure 1 is a sectional view, showing the improvement applied to a melting and smelting furnace; Fig. 2, a sectional plan view on the line 1 2, Fig. 1; Fig. 3, a sectional elevation on the line 3 4, Fig. 2; Fig. 4, a sectional elevation on the line 5 6, Fig. 2; Fig. 5, a sectional elevation on the line 7 8, Fig. 2; and Fig. 6, an inverted plan view of part of the furnace.

A A′ are the side walls, B B the end walls, and C is the top, of a melting and smelting furnace, at each end of which is a fire-place, D. The top C of the furnace is arched transversely and depressed in the center, as shown in Fig. 1, and midway between the two fire-places is a basin or "bosh," E, at each side of which is an inclined bed, F.

At the side of the wall A are, in the present instance, two chimneys or stacks, G G, which communicate with the furnace, one at the side of one bed and the other at the side of the other bed, F, the bottom of each side being inclined toward the bed, as shown in Fig. 3.

At the opposite side of the furnace are two inclined chambers, H H, each of which is closed at the outer end by a slab, *b*. In the side of one of the walls of each chamber H are openings *c c*, and near the lower end of each stack G is an opening, *e*. To a rod, *i*, extending across each fire-place D, are connected a number of grate-bars, *m*, which rest at their outer ends on a rod, *n*, and beneath the bars is a shaft, *v*, arms on which bear against the under sides of the bars, so as to alternately raise and lower the same on vibrating the shaft. In the wall A, opposite each fire-place, are openings *h h′*, which are furnished with suitable doors, and in the wall, opposite the basin E, are openings *t t′*, Fig. 4.

From a blast-pipe, I, extend four branches, *d d f f*, each of the pipes *d* passing through the wall A into the ash-pit of one of the fire-places, and through each end wall B B, below the fire-grate, passes a steam-pipe, *g*. Each of the branch pipes *f f* extends to an air-chamber, J, which communicates, through openings *s s*, with the furnace, the said openings being so inclined that jets of air passing through the same shall be directed on the adjacent bed or hearth F. Each of the pipes *f d g* is provided with suitable stop-cocks for regulating the admission of air or steam to the furnace.

When a metal is to be abstracted from masses of ore, the furnace is first thoroughly heated, the fire-place doors are closed, the ore and limestone are thrown into the stacks G G, stoppers are placed on the openings *c*, and slabs over the tops of the stacks, the stoppers and slabs being so formed as not to completely close the openings to which they are fitted. Air and steam are now admitted, through the pipes *d*, *f*, and *g*, into the furnace, and the gases pass from the furnace through the outlets at the sides of the stoppers of the openings *c*, and of the slabs at the tops of the chimneys, the blasts and jets of steam being so regulated that the pressure of gases within is greater than that of the air without the furnace.

After the material in the stacks has been sufficiently heated or roasted, a portion of the same is moved onto the beds F, where it is subjected to the action of the blast from the openings *s s*, by which the heat is concentrated on the mass of ore so as to quickly affect its reduction, the metal flowing down the inclined beds into the basin E, from which it is removed through the tapping-hole *t*, the slag being withdrawn through the opening *t'*.

As the steam and air pass from the ash-pit through the mass of fuel they are decomposed, and the gases resulting from this decomposition mingle with the air from the openings *s* and with the products of combustion above the fuel, where the combustible portions are consumed, the heat, which is much greater than when the steam is introduced above the fire, as usual, being carried by the blast to the desired points, instead of being concentrated in the fire-place, as in ordinary furnaces.

Owing to the pressure within the furnace, a most perfect combustion of the gases is effected without the necessity of a draft, which carries the gases from the furnace before they are consumed, and causes them to pass in rapid currents through the furnace, and "cut" the walls or plates exposed to their action. Owing to the absence of draft, also, the flame, instead of passing to the chimney, is maintained in contact with the parts to be heated.

In consequence of the pressure within the furnace, however, the heated gases will flow toward exit-openings, wherever the latter are situated. The heat may therefore be distributed over a great extent of space, or to distant or lateral parts of the furnace.

Although the improvements have been illustrated and described in connection with a smelting and melting furnace, it will be apparent that they may be applied to furnaces for steam-boilers, evaporating-pans, &c., and it will be seen that, whatever may be the arrangement of the parts, the attendant, by turning the cocks of the different pipes, may regulate the heat as desired, while the concentration or diffusion of the heat is effected by imparting the proper inclination or position to the openings *s s*.

Without confining ourselves to the precise construction and arrangement of parts described, we claim as the invention of the aforesaid JACOB GREEN—

1. A furnace in which currents of air are introduced above the fire and a mixture of air and steam is passed upward through the fire, substantially as and for the purpose described.

2. A furnace in which the gases produced by the passage of mixed air and steam through, and of air above, the fire are maintained under a pressure greater than that of the external air.

3. A furnace in which the gases are maintained under pressure, and in which openings are arranged at the points to which the heat is to be directed, substantially as and for the purpose described.

4. The combination, with a furnace, of blast-pipes so arranged above the fuel as to direct the heated products of combustion to any desired part or parts of the furnace, substantially as set forth.

In testimony whereof we have signed our names to this specification before the subscribing witnesses.

JACOB GREEN.
THOMAS H. WILLSON.
HIRAM WILLSON.
CHARLES R. ADAMS.
SAMUEL MUNN.

Witnesses:
JOHN WHITE,
H. HOWSON,
EDWIN F. CORRY, Jr.,
WM. A. STEEL.